United States Patent Office 3,759,719
Patented Sept. 18, 1973

3,759,719
PRESERVATION OF FRUITS WITH SULFATE AND DIHYDROGEN PHOSPHATE SALTS OF 5-ACETYL-8-HYDROXY-QUINOLINE
Ernst Hodel and Karl Gatzi, Basel, Switzerland, assignors to Ciba-Geigy Corporation, Ardsley, N.Y.
No Drawing. Continuation-in-part of abandoned application Ser. No. 704,588, Feb. 12, 1968. This application Dec. 8, 1970, Ser. No. 96,240
Claims priority, application Switzerland, Feb. 16, 1967, 2,281/67
Int. Cl. A23b 7/00
U.S. Cl. 99—154                          5 Claims

ABSTRACT OF THE DISCLOSURE

A method for preserving edible fruits and parts of plants against microbial deterioration by means of microbicidally effective amounts of the sulfate and phosphate salts of 5-acetyl-8-hydroxy-quinoline are described. While 5-acetyl-8-hydroxy-quinoline and its hydrochloride have strong irritant action on the mucous membranes and skin of humans, the new salts are virtually free from these drawbacks when applied in microbicidally effective amounts to the surface of edible plant parts.

---

This application is a continuation-in-part of our application Ser. No. 704,588, filed Feb. 12, 1968, and now abandoned.

BACKGROUND OF THE INVENTION

A series of microbicidal active substances for conserving fruit is known from the literature, e.g. diphenyl, alkali metal salts of o-hydroxydiphenyl, e.g. sodium-o-hydroxydiphenyl and salicylanilide, also thiourea, ammonia, sulphur dioxide, carbon dioxide etc. [Ullmann, 3rd edition, vol. 11, pp. 440–462 (1960)]. Such substances, however, olny partially meet the desired requirements as either the breadth and duration of action is too slight or they are too toxic to warm blooded animals or they have an unpleasant smell.

DESCRIPTION OF PRIOR ART

The base 5-acetyl-8-hydroxy-quinoline itself as well as its acid sulfate salt (5-acetyl-8-hydroxy-quinoline hydrogen sulfate)

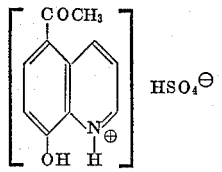

M.P. 248° C. with decomposition are known from J. Am. Chem. Soc. 52, 4433–4436 (1930); the fungicidal activity of the base is known from German Pat. No. 961,668 or the British Pat. 776,223. It is also known that 5-acetyl-8-hydroxy-quinoline and its hydrochloride have a strong irritant action on the skin and mucous membranes.

DETAILED DISCLOSURE

The present invention concerns a method for preserving fruits and other edible parts of plants using microbicidal amounts of bis - (5 - acetyl-8-hydroxy-quinoline)-sulfate and 5-acetyl-8-hydroxy-quinoline di-hydrogen phosphate corresponding to the formulae

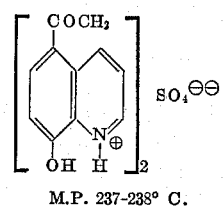

M.P. 237-238° C.

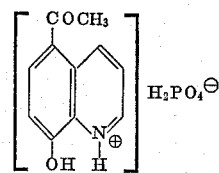

M.P. 230-235° C. with decomposition

These salts have not been known hitherto.

It has been found that these salts have excellent microbicidal properties. They are active very particularly against a broad spectrum of microoganisms which attack fruits, roots or other edible parts of plants after harvesting, among which microorganisms there are especially bacteria, yeasts and fungi. The new salts are particularly valuable for this reason as active substances in preserving agents which are used, e.g. for citrus fruits such as grapefruit, oranges, lemons, also bananas, pineapple, avocados, mango, guajava, litchi, nut kernels, apples, pears, peaches, apricots, plums, grapes, strawberries, guava, sweet potatoes, potatoes, yams, carrots, turnips, sugar beet, onions, lettuce, artichokes, cabbage, asparagus, edible mushrooms, etc. In addition, these salts also have the other properties required of active substances for food preservatives, i.e. in the concentration necessary to preserve foodstuffs they are non-toxic to man and they have no adverse effect on the taste and smell of the foodstuff. These new salts are practically neutral compounds and do not alter the pH of the substrate; furthermore they do not or to a much smaller extent irritate the skin and mucous membranes of humans; also they are non-toxic to man under the above-described conditions and are, therefore, particularly suitable for practical uses as food preservatives.

The aforesaid new salts can be produced by conventional processes, e.g. by reaction of 5-acetyl-8-hydroxyquinoline with the equivalent amount of acid. They are compounds which crystallise well, they are very stable in air and, in contrast to 5-acetyl-8-hydroxy-quinoline itself, also in neutral or weakly acid media.

These two salts are distinguished by good fungicidal properties. They are soluble to a certain extent in water and in organic solvents.

As preserving agents these salts are applied in an amount of from about 0.005 to about 2.0, preferably about 0.01 to about 0.5 milligram per square centimeter of the surface of the fruit, plant or plant part to be treated.

The fungitoxic action of the new salts and of some substances known from the prior art was determined by the so-called "spore germination test" on the following types of fungi:

*Penicillium italicum*
*Penicillium digitatum*
*Rhizopus nigricans*
*Aspergillus niger*
*Botrytis cinerea*

1 ccm. of a 1%, 0.5%, 0.1% and 0.01% solution of each active substance in a suitable solvent such as acetone is placed on 2 glass slides (26 x 76 mm.) under the same conditions. The solvent is evaporated off and a uniform coating of active substance is obtained on the glass slides. The slides are inoculated with spores of the above fungi and then kept in dishes at room temperature in an atmosphere which is almost saturated with steam. The germinated spores are counted twice, once after 48 hours and the second time after 72 hours. The results are summarised in the following tables.

The test was run with healthy, completely ripened oranges and for each run 20 fruits were used. The orange peel was injured by means of a small board fitted with needles, with which 30 pinpricks, about 2 mm. deep, were applied to each orange. The fruits were then dipped during one minute at room temperature into an aqueous suspension of spores of *Penicillium digitatum*, containing about 100,000 spores per milliliter and left to dry. Then they were dipped for one minute into another aqueous solution or suspension, also at room temperature, containing 1% by weight of the substance to be tested. The fruits were then left to dry and packed into two paper bags each containing 10 oranges. The bags were stored at room temperature. The evaluation of the fruits was made the 5th and the 8th day after treatment and the oranges were inspected for attack by *Penicillium digitatum*.

A control run of 20 oranges was injured and exposed to the suspension of spores of *Penicillium digitatum* the same way but not treated with active substance.

TABLE I

| Compound | Concentration, percent | Action against— |||||| 
|---|---|---|---|---|---|---|---|
| | | *Penicillium italicum* || *Penicillium digitatum* || *Aspergillus niger* ||
| | | 48 hr. | 72 hr. | 48 hr. | 72 hr. | 48 hr. | 72 hr. |
| 5-acetyl-8-hydroxy-quinoline dihydrogen phosphate | 0.1<br>0.01 | ++<br>− | ++<br>− | ++<br>++ | ++<br>++ | ++<br>− | ++<br>− |
| Bis-(5-acetyl-8-hydroxy-quinoline) sulfate | 0.1<br>0.01 | ++<br>− | ++<br>− | ++<br>+ | ++<br>+ | ++<br>− | ++<br>− |
| Diphenyl | 0.1<br>0.01 | −<br>− | −<br>− | +<br>− | −<br>− | −<br>− | −<br>− |
| Sodium-o-chlorophenyl phenolate | 0.1<br>0.01 | −<br>− | −<br>− | +<br>+ | −<br>− | −<br>− | −<br>− |
| Tetramethyl thiuram di-sulfide | 0.1<br>0.01 | −<br>− | −<br>− | +<br>+ | +<br>− | −<br>− | −<br>− |
| Control | | − | − | − | − | − | − |

TABLE II

| Compound | Concentration, percent | *Botrytis cinerea* ||
|---|---|---|---|
| | | 48 hr. | 72 hr. |
| Bis-(5-acetyl-8-hydroxy-quinoline) sulfate | 0.1<br>0.01 | ++<br>− | ++<br>− |
| Diphenyl | 0.1<br>0.01 | −<br>− | −<br>− |
| Tetramethyl thiuram di-sulfide | 0.1<br>0.01 | −<br>− | −<br>− |
| Control | | − | − |

LEGEND: ++=Complete inhibition of germination caused by residue of 1 ccm. of solution of active substance. +=A 60 to 90% inhibition of germination caused by residue of 1 ccm. of solution of active substance, −=No inhibition of germination.

Fruit and other edible parts of plants are preserved according to the invention by providing them with a protive coating of the new salts by either dipping, spraying, washing or painting them with liquid or waxy preparations containing a microbicidally effective amount of the active substances. In many cases, because of their advantageous solubility in water, the new microbicidal salts can be used in the form of aqueous solutions. On the other hand, it is possible to mix the active substances together with suitable non-injurious dispersing agents such as vegetable oils, fats or waxes and to use these dispersible preparations as aqueous or anhydrous dispersions.

Solvents suitable for use in such dispersions are non-toxic, low-boiling, organic solvents such as low-molecular hydrocarbons, such as pentane, hexane, ketones, alcohols and ethers, such as methoxy ethanol or ethoxy ethanol.

A test to preserve oranges was made wtih the bis-(5-acetyl-8-hydroxy-quinoline) sulfate and two substances known from the prior art.

The results are shown in Table III.

TABLE III

| Substance to be tested | Evaluation of oranges— ||||
|---|---|---|---|---|
| | 5 days || 8 days ||
| | After infection by *Penicillium digitatum* ||||
| | Infected | Healthy | Infected | Healthy |
| Bis-(5-acetyl-8-hydroxy-quinoline) sulfate | 1 | 19 | 10 | 10 |
| 5-acetyl-8-hydroxy-quinoline (base) | 9 | 11 | 14 | 6 |
| Bis-(8-hydroxy-quinoline) sulfate (Chinosol) | 2 | 18 | 20 | 0 |
| None (control) | 9 | 11 | 20 | 0 |

The new salts may be applied directly as an aqueous solution or preferably in the form of a ready made application form. Such a paste, a pulverulant concentrate, an emulsion concentrate and a wax are described below; where not expressly stated, parts and percentages are by weight. Temperatures are given in degrees centigrade.

Paste 20 parts of bis-(5-acetyl-8-hydroxy-quinoline) sulfate
20 parts of a 1% aqueous hydroxyethyl cellulose solution
3 parts of ditertiary acetylene glycol
57 parts of distilled water are milled and homogenised in a mixer into a thinly flowing 20% paste. On direct addition to water, the paste forms a milky dispersion. Freshly harvested oranges are dipped into a 1% dispersion and allowed to drip dry. About 0.01 to 0.1 mg. of active substance remained on the fruit per cm.² surface. It was observed that the fruit showed no damage whatever due to micro-organisms after several days.

Pulverulent concentrate 95 parts of bis-(5-acetyl-8-hydroxy-quinoline) sulfate and 5 parts of a condensation product of nonylphenol and ethylene oxide (molar ratio 1:9 to 1:10) or another suitable, preferably non-ionic, wetting agent are homogenised and finely milled in a suitable mill. This pulverulant concentrate is not dusty and quickly dissolves in water. A suspension, in 1% concentration, evenly wets fruit treated therewith.

Emulsion concentrate 10 parts of 5-acetyl-8-hydroxy-quinoline dihydrogen-phosphate
15 parts of ethoxyethanol
15 parts of dimethyl formamide
10 parts of emulsifying agent consisting of a mixture of calcium dodecylbenzene sulphonate and the condensation product of nonylphenol and ethylene oxide (molar ratio about 1:8 to 1:10)
50 parts of petroleum (boiling range 230-270°).

This mixture is a 10% emulsion concentrate which can be diluted with water to form emulsions of any concentration desired.

A 1% aqueous emulsion is used for the treatment of mould (e.g. *Penicillium italicum*) on grapefruit. For this purpose, the fruit is dipped in the emulsion and left there for a few seconds. It is then allowed to drip dry. About 0.01 to 0.1 mg. of active substance remains on the fruit per $cm.^2$ surface. The emulsion can also be sprayed on to the grapefruit or the latter can be washed therewith or can be applied thereto with a brush. The attack by fungi is greatly reduced by this treatment and any new infection is prevented.

Paraffin blocks 890 parts of melted soft paraffin (M.P. 41-43°) are mixed with 100 parts of paraffin oil at about 60°, and 10 parts of very finely ground (average particle size 20-50 microns) bis-(5-acetyl-8-hydroxyquinoline) sulfate are worked in until a homogeneous substance is obtained, which is poured into forms and then allowed to harden.

The resulting blocks are then used in a molten state in suitable apparatus, with slight heating, to coat citrus fruit with a thin film of bis-(5-acetyl-8-hydroxyquinoline) sulfate in paraffin and thus protect them against spoilage. This apparatus may wax the surface of the citrus fruit e.g. by a rubbing action.

The consistency of the blocks can be varied as desired by increasing the amount of paraffin oil and also optionally adding surfactants such as sorbitan fatty acid esters, e.g. sorbitan-sesquioleate, sorbitan-monooleate, sorbitan-trioleate, polyoxyethylene-sorbitan fatty acid esters, to obtain an increasingly softer block, thus adjusting the consistency to the requirements of the particular coating apparatus used.

Paraffin emulsion 440 parts of soft paraffin (M.P. 41-43°), 220 parts of paraffin oil, and 50 parts of Arlacel 83 (sorbitan-sesquioleate) are melted together while stirring at 50-60°. A hot solution (80°) of 300 parts of distilled water and 10 parts of bis-(5-aceto-8-hydroxyquinoline) sulfate is stirred into the melt which is still warm (50°) with a suitable stirring apparatus (e.g. a Homorex-mixer) until a homogeneous substance is obtained.

The resulting water-in-oil emulsion is stirred while allowing to cool to about 30°. A creamy substance of soft consistency is obtained, which can be applied in suitable apparatus, e.g. by brushing, or lightly rubbing the peel of citrus fruit.

The concentration of active substance in the composition can also be varied (e.g. 0.5% or 1.5%). In lieu of Arlacel 83, other paraffin emulsifying agents, e.g. mixtures of Span 80 and 85 (sorbitan-monooleate and sorbitan-trioleate) can be used as well as other inert substances suitable for preparing similar water-in-oil emulsions of end products having optimal consistency, whereby the consistency can be adapted to the requirements of the particular apparatus used for wax-coating the citrus fruit.

The term "edible parts of plants" as used in this specification and the appended claims refers to edible blossoms, seeds, fruit, leaves, sprouts, roots, bulbs and/or tubers of plants.

We claim:
1. A method for protecting fruits and edible parts of plants against microbial deterioration, comprising applying to the surface of such plant part a microbicidally effective amount of a preserving agent selected from the bis-(5-acetyl-8-hydroxyquinoline) sulfate, M.P. 237-238° C., the 5-acetyl-8-hydroxyquinoline dihydrogen phosphate, M.P. 230-235° C. and a mixture thereof.
2. A method as described in claim 1, wherein said salt or mixture of salts is applied, per square centimeter of said plant part surface, in an amount of at least 0.01 milligram.
3. A method as described in claim 1, wherein said salt or mixture of salts is applied, per square centimeter of said plant part surface, in an amount of from 0.01 to about 0.5 milligram.
4. A method as described in claim 1, wherein said salt is bis-(5-acetyl-8-hydroxyquinoline) sulfate, M.P. 237-238° C.
5. A method as described in claim 1, wherein said salt is 5-acetyl-8-hydroxyquinoline dihydrogen phosphate, M.P. 230-235° C.

References Cited
UNITED STATES PATENTS

| | | | |
|---|---|---|---|
| 2,606,189 | 8/1952 | Grier | 260—286 |
| 2,615,814 | 11/1952 | Geary | 99—154 |

FOREIGN PATENTS

| | | |
|---|---|---|
| 776,223 | 6/1955 | England. |

OTHER REFERENCES

Chem. Abstracts, vol. 55, 11552, 1961, Quinolin Derivatives as Anti-Infective Agents, Bahal.

NORMAN YUDKOFF, Primary Examiner

H. H. BERNSTEIN, Assistant Examiner

U.S. Cl. X.R.
260—286; 99—103